United States Patent
Kindler et al.

[11] Patent Number: 5,993,549
[45] Date of Patent: Nov. 30, 1999

[54] POWDER COATING APPARATUS

[75] Inventors: Helmut Kindler; Martin Huonker, both of Stuttart, Germany

[73] Assignee: Deutsche Forschungsanstalt fuer Luft- und Raumfahrt e.V., Bonn, Germany

[21] Appl. No.: 08/783,957

[22] Filed: Jan. 16, 1997

[30] Foreign Application Priority Data

Jan. 19, 1996 [DE] Germany ............... 196 01 785
Feb. 21, 1996 [DE] Germany ............... 196 06 383

[51] Int. Cl.$^6$ .................. B05B 7/00; B23K 26/00
[52] U.S. Cl. ..................... 118/308; 219/121.84
[58] Field of Search ................. 118/308, 300; 219/121.84, 121.6; 239/135, 133, 136

[56] References Cited

U.S. PATENT DOCUMENTS 4,947,463  8/1990  Matsuda et al. ............ 219/121.84
4,958,058  9/1990  Scheidt et al. ............. 219/121.84
5,229,272  7/1993  Ito ....................... 219/121.84

FOREIGN PATENT DOCUMENTS 39 42 049  8/1990  Germany.
4001091  7/1991  Germany.

Primary Examiner—David A. Simmons
Assistant Examiner—Calvin Padgett
Attorney, Agent, or Firm—Barry R. Lipsitz; Ralph F. Hoppin

[57] ABSTRACT

In order to improve a powder coating arrangement for the application of melted coating powder onto a substrate, comprising a preparation unit for generating a flow of coating powder, a powder applicator head, from which the flow of coating powder issues and spreads in the form of a directed jet of powder towards the substrate, a melting zone, through which the flow of coating powder passes in a direction of passage, and an optical beam guidance system, which directs a laser beam generated by a laser onto the melting zone to melt the coating powder, such that the coating powder may be essentially completely melted before impact on the substrate, it is proposed that the melting zone is arranged in the powder applicator head, and that the optical beam guidance system is equipped with several elements for reflecting the laser beam, which permit the laser beam to pass several times through at least one heating zone for the flow of coating powder in the region of the melting zone transversely to the direction of passage.

23 Claims, 8 Drawing Sheets

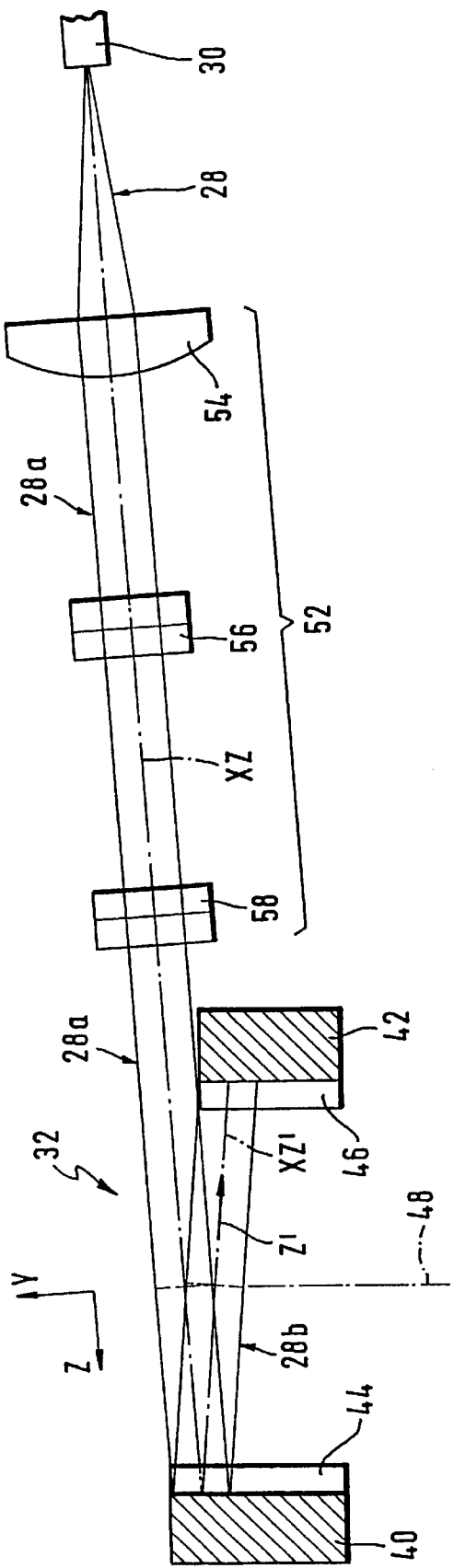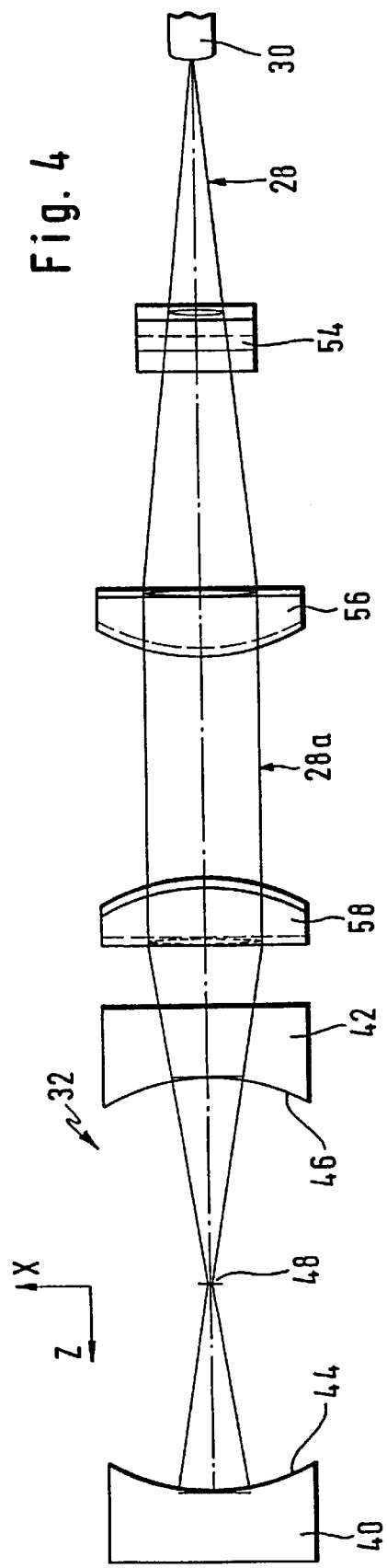

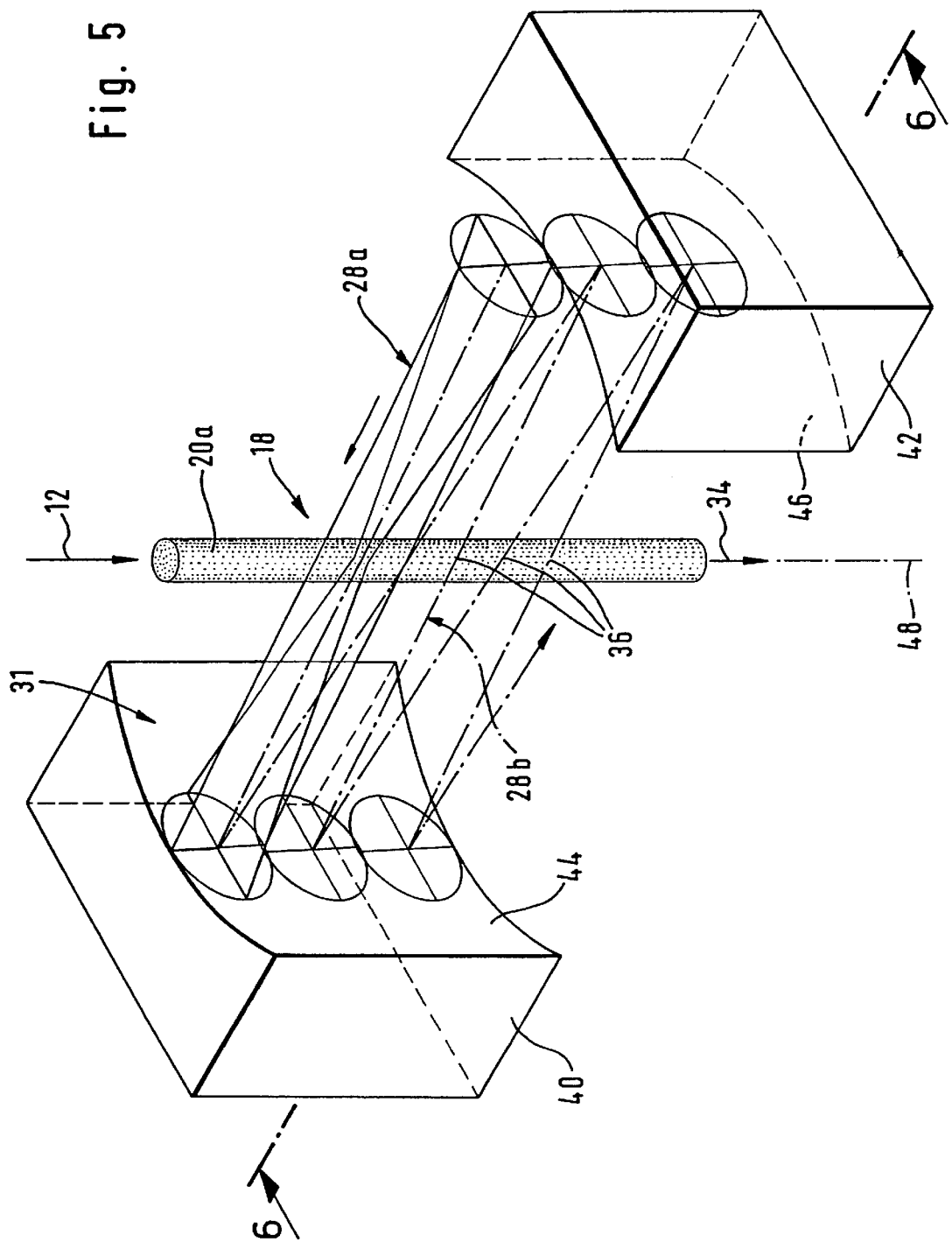

POWDER COATING APPARATUS

BACKGROUND OF THE INVENTION

The invention relates to a powder coating arrangement for the application of melted coating powder onto a substrate, comprising a preparation unit for generating a flow of coating powder, a powder applicator head, from which the flow of coating powder issues and spreads in the form of a directed jet of powder towards the substrate, a melting zone, through which the flow of coating powder passes in a direction of passage, and an optical beam guidance system, which directs a laser beam generated by a laser onto the melting zone to melt the coating powder.

Such powder coating arrangements are known from the prior art. In these, the melting zone is located for the most part in the vicinity of the substrate, so that the optical beam guidance system aligns the laser beam in the direction of the substrate and the powder jet and laser beam meet in the melting zone close to a surface of the substrate. In this arrangement, the coating powder is not completely melted, but partially melted. Therefore, the laser beam not only heats the coating powder transported in the jet of powder in the melting zone, but also simultaneously heats a melt forming on the substrate, in which the coating powder is ultimately melted completely.

As a result of this, it is not possible using such a powder coating arrangement, for example, to coat all those substrates which change in an undesirable manner through the action of laser light.

Therefore, the object of the invention is to improve a powder coating arrangement of the type described in such a way that the coating powder may be essentially completely melted before impact on the substrate.

SUMMARY OF THE INVENTION

This object is achieved according to the invention with a powder coating arrangement of the type described above in that the melting zone is arranged in the powder applicator head, and that the optical beam guidance system is equipped with several elements for reflecting the laser beam, which permit the laser beam to pass several times through at least one heating zone for the flow of coating powder in the region of the melting zone transversely to the direction of passage.

The advantage of the solution according to the invention is that, because the melting zone is located in the powder applicator head and the laser beam is passed through the flow of coating powder in a direction running transversely to the direction of passage, it is assured that the coating powder can be completely melted by means of the laser light.

In addition, effective and adequate heating of the coating powder is guaranteed because the laser light is passed several times through the flow of coating powder, and therefore in order to generate a sufficiently adhesive layer, it is no longer essential to additionally have a melt heated by the laser beam located directly on the substrate.

In order to melt the coating powder in the melting zone, it would be sufficient if the laser beam passing several times through the flow of coating powder always passes through the same heating zone.

However, the power available in the laser beam is utilised even more efficiently if the optical beam guidance system guides the laser beam through several heating zones located adjacent to one another in the melting zone, so that the particles of coating powder can be heated by the same laser beam in several adjacent heating zones, and the available power can thus be better utilised.

A particularly advantageous solution provides that the heating zones form a series of consecutive heating zones extending in the direction of passage.

Purely in principle, the heating zones could be arranged so that they respectively only cover a part of the cross-section of the flow of coating powder.

However, it is particularly advantageous if the heating zone covers the entire cross-section of the flow of coating powder.

In principle, it would be conceivable to pass the laser beam as a parallel beam through the stream several times using the optical beam guidance system. However, it is particularly advantageous, especially since one cross-section of the flow of coating powder is generally relatively small, if the optical guidance system has elements focussing the laser beam.

The focussing elements are preferably constructed so that they focus the laser beam onto the heating zone in at least one beam plane.

It is particularly advantageous for effective interaction with the flow of coating powder in this case, if the beam plane, in which the laser beam is focussed, runs transversely to the direction of passage.

Moreover, efficiency of the interaction between the laser beam and the flow of coating powder is particularly favourable, if, in a beam plane parallel to the direction of passage, the laser beam passes unfocussed, preferably collimated, through the heating zone in order to obtain a long interaction area in the direction of passage for the heating operation. The long interaction area is necessary, since too much energy in too small an area would cause the powder to vaporise.

No further details have thus far been given in association with the description of individual embodiments with respect to the beam guidance by means of the optical beam guidance system. Hence, it could be conceivable, for example, to guide the laser beam constantly in a circle or spiral shape in the manner of a ring laser. However, a particularly compact structural solution provides that the optical beam guidance system reflects the laser beam back and forth.

It is particularly expedient here if the optical beam guidance system reflects the laser beam back and forth in one plane, the laser beam being able to run in a zigzag formation in this plane in order to pass through several heating zones in the melting zone.

In this case the plane is preferably oriented so that it runs parallel to the direction of passage. The plane preferably forms a plane of symmetry to the flow of coating powder moving through the melting zone in the direction of passage, so that the coating powder may be heated in several consecutive heating zones by the laser beam being reflected back and forth.

The plane, in which the laser beam is reflected back and forth, preferably runs perpendicular to the beam plane, in which the optical beam guidance system focusses the laser beam towards the respective heating zone.

It is preferably further provided that the optical beam guidance system guides the laser beam as an essentially parallel (collimated) beam in the beam plane coinciding with the plane, in which the laser beam runs in zigzag formation, since in the respective heating zone the laser beam thus covers the largest possible portion of the flow of coating particles extending in the direction of passage.

A wide variety of solutions are possible with respect to the construction of the optical beam guidance system. Hence, it is conceivable, for example, to construct the optical beam guidance system from separately arranged, individual reflecting surfaces.

It is particularly advantageous if the optical beam guidance system only has two reflecting surfaces arranged opposite one another, against which the laser beam strikes several times.

In this case, the reflecting surfaces preferably extend essentially parallel to the direction of passage, and also transversely to the direction of propagation of the laser beam in the optical beam guidance system, so that during reflection back and forth between these reflecting surfaces, the laser beam strikes several times against the same respective reflection surface, although possibly at a different location thereon.

For focussing the laser beam onto the respective heating zone, it is possible, in principle, to provide special focussing elements arranged for this purpose, e.g. lenses.

However, a particularly advantageous solution according to the invention provides that the reflecting surfaces have a curvature focussing the laser beam.

In particular, if the laser beam is only to be focussed in a beam plane lying transversely to the direction of passage, an advantageous provision is that the reflecting surfaces are constructed as cylindrically curved reflecting surfaces, whereby, in the simplest case, the reflecting surface has a circular cylindrical curvature.

The cylinder axis of the reflecting surfaces is preferably placed so that it runs parallel to the plane, in which the laser beam is reflected back and forth.

Moreover, to achieve optimum reproduction ratios, it is provided that the reflecting surfaces are arranged approximately concentrically to one another, whereby, in the case of cylindrical reflecting surfaces, the focus lines approximately coincide. Instead of two cylindrical mirrors, a reflector tube or a luminous cone may also be considered here.

In order to achieve optimum screening of the substrate from the laser radiation, it is provided that after passing through the optical beam guidance system, the laser beam exits from it on a side averted from the substrate, so that only stray light exits from the optical beam guidance system on the side facing the substrate.

In this case, all sides of the optical beam guidance system which are not directly facing the substrate are averted from the substrate.

It is particularly advantageous for screening the laser radiation, if, after passing through the optical beam guidance system, the laser beam exits from it again on a coupling-in side thereof, so as to allow the existing laser beam to be absorbed in a simple manner.

The coupling-in side for the laser beam preferably lies on a side of the optical beam guidance system averted from the substrate, so that the substrate may be screened from the laser radiation in a particularly favourable manner.

In the case of two reflecting surfaces, which are aligned exactly parallel and located opposite one another, a laser beam coupled transversely or obliquely to the direction of passage moves between the reflecting surfaces, by being reflected back and forth, from the coupling-in side and through the optical beam guidance system to a side opposite the coupling-in side, and leaves the optical beam guidance system on this side.

However, to ensure that the laser beam enters the optical beam guidance system and exits from it again only on one side, the reflecting surfaces are preferably not aligned parallel to one another, but tilted relative to one another at a small tilting angle, which opens towards the coupling-in side of the laser beam, so that the laser beam being reflected back and forth does not constantly move away from the coupling-in side as the number of reflections on the reflecting surfaces increases, but only moves as far as a location, which may be fixed by the tilting angle, and then moves back again to the coupling-in side by further reflection back and forth between the reflecting surfaces.

No further details have thus far been given in association with the description of the individual embodiments with respect to the type of guidance of the flow of coating powder.

Hence, an advantageous solution provides that the coating powder is guided through the melting zone in the form of a jet of powder surrounded by a protective gas envelope, whereby the protective gas envelope not only serves to protect the jet of powder from gases penetrating from the outside, but also serves to hold the jet of powder together on as narrow a cross-section as possible, and thus ensure that the flow of coating powder is covered by the laser beam over its entire cross-section.

In order to support this effect of the protective gas envelope holding the jet of powder on a narrow cross-section, it is preferably provided that in the region of the melting zone, the protective gas envelope and the jet of powder pass through a jacket tube, which is transparent to the laser beam, and said jacket tube serves to prevent the protective gas envelope from widening radially on its outer side, and thus to also hold the jet of powder on as narrow a cross-section as possible by means of the envelope of protective gas.

No further details have been given with respect to the manner of generation of the protective gas envelope. Hence, an advantageous embodiment provides that the protective gas envelope may be generated by a ring nozzle.

In this case, for generation of the protective gas envelope, a ring nozzle is preferably provided which is arranged upstream of the melting zone—viewed in the direction of passage—in order to ensure that the jet of powder, which is surrounded by the protective gas envelope in this configuration, can be passed through the entire melting zone.

So that the flow rate of the coating powder in the melting zone may be fixed independently of the speed, at which the coating powder flows in the direction of the substrate after the melting zone, a preferred provision is that, after passing through the melting zone, the flow of coating powder is covered by an accelerating gas stream and transported to the substrate.

The accelerating gas stream is preferably also a protective gas stream.

In particular, the accelerating gas stream enables the flow of coating powder to be brought to such a high speed that it is possible to also coat a surface running obliquely or perpendicular to the horizontal, with it, or even coat a surface from underneath.

A particularly advantageous configuration, moreover, provides that the jacket tube guiding the jet of powder and the protective gas envelope is likewise surrounded on the outside by a further protective gas stream, which cools the jacket tube on its outside and the area between the reflecting surfaces, and in particular, after an outlet of the jacket tube, additionally acts on the protective gas envelope so as to guide it as far as the substrate, while still surrounding the jet of powder as closely as possible.

It is particularly expedient to use the further protective gas stream as accelerating gas stream.

Further features and advantages of the invention are the subject of the following description as well as of the drawings showing some embodiments.

BRIEF DESCRIPTION OF THE DRAWINGS

FIG. 3 shows a section taken along line 3—3 in FIG. 2;

FIG. 4 shows a section taken along line 4—4 in FIG. 2;

FIG. 5 is a perspective representation of the laser beam in the optical beam guidance system according to the invention, shown together with the flow of coating particles;

DETAILED DESCRIPTION OF THE INVENTION

Figure 1:
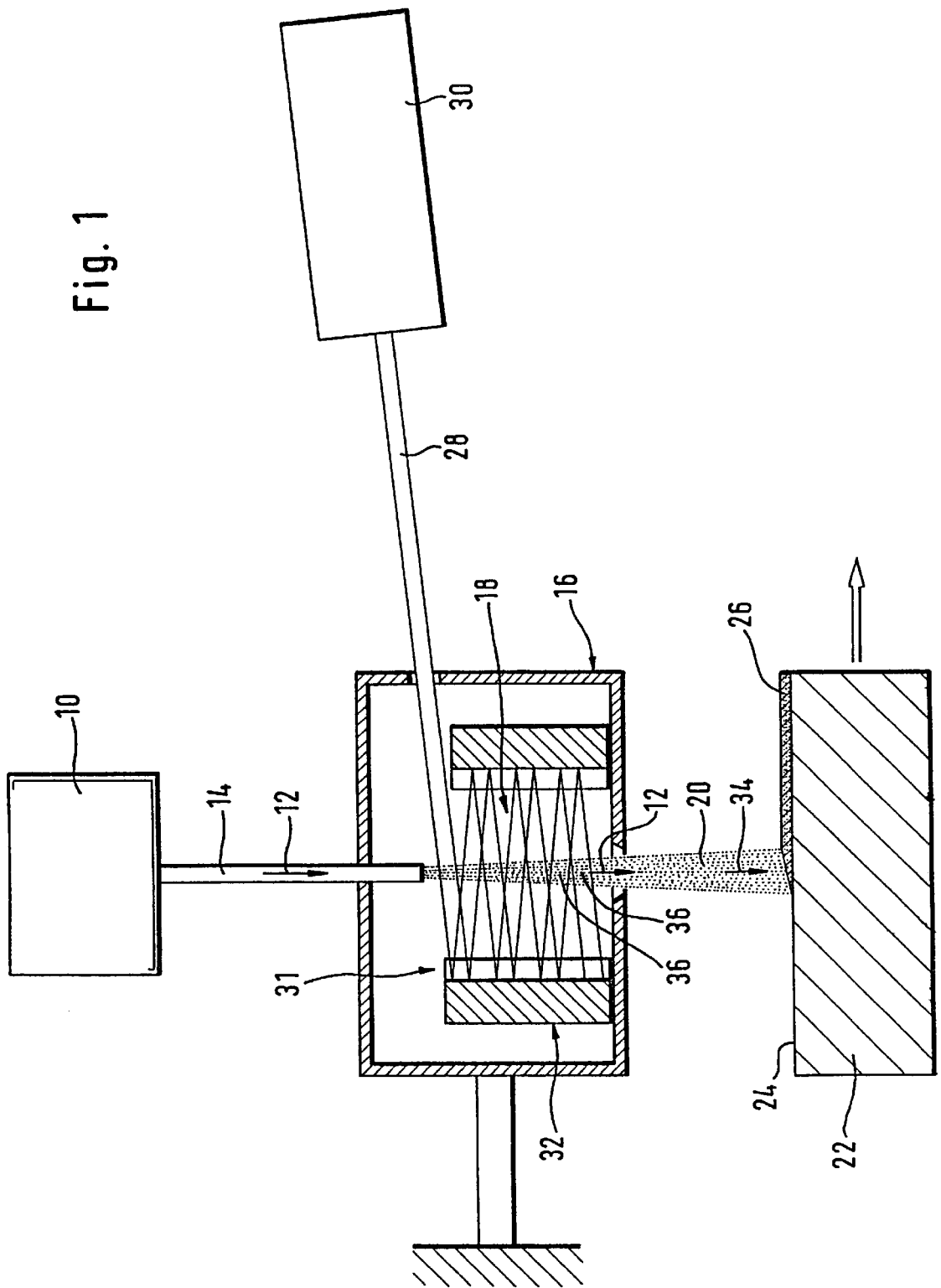
FIG. 1 is a schematic representation of a powder coating arrangement according to the invention.

An embodiment of a powder coating arrangement according to the invention shown in FIG. 1 comprises a preparation unit 10 for the coating powder, which generates a flow of coating powder 12, in which individual particles of the coating powder are preferably transported by means of a carrier gas.

In this case, the flow of coating powder 12 is guided through a powder pipe 14 to a powder applicator head, given the overall reference 16. In this powder applicator head, the flow of coating powder 12 passes through a melting zone, given the overall reference 18, then exits from the powder applicator head 16 as a free jet of powder 20, and spreads in the direction of a substrate 22, on the surface 24 of which a layer 26 formed from the coating powder collects, when the powder applicator head 16 and the substrate 22 are moved relative to one another.

In order to melt the coating powder 12 in the melting zone 18, a laser 30 generating a laser beam 28 is provided, whereby said laser beam 28 enters the powder applicator head 16 and is guided inside it by an optical beam guidance system, given the overall reference 32, in such a way that in the melting zone 18, the laser beam passes several times through the flow of coating powder transversely to its direction of passage 34 through the melting zone 18, and in so doing, forms a plurality of heating zones 36 in the region of intersection between the laser beam 28 and the accelerating gas stream 12, so that the coating powder passing through the heating zones 36 is melted when it leaves the melting zone 18.

Figure 2:
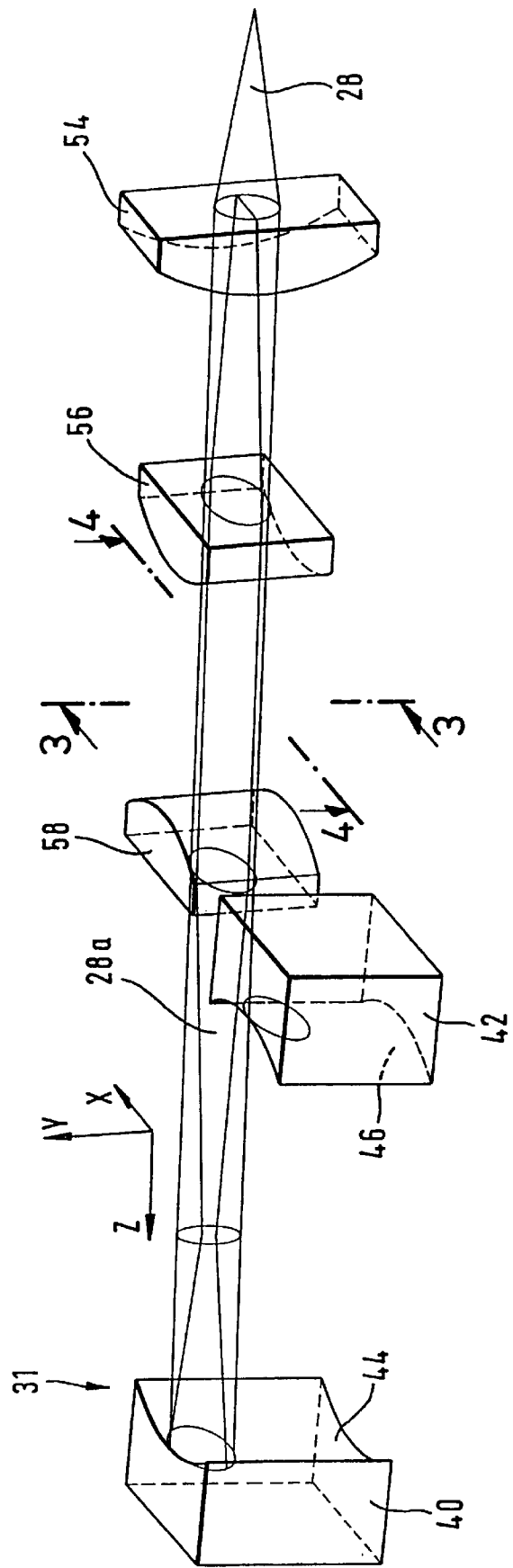
FIG. 2 is an enlarged representation of an optical beam guidance system of the powder coating arrangement according to the invention, shown together with an optical coupling system.

As shown in FIGS. 2 to 4, the optical beam guidance system 32 comprises two facing cylindrical mirrors 40 and 42, with their mirror surfaces 44 and 46 respectively shaped as cylindrical faces arranged essentially concentric to a focus line 48, said focus line 48 being oriented parallel to the direction of passage 34 of the flow of coating powder 12.

The mirror surfaces 44 and 46 of the cylindrical mirrors 40 and 42 are shaped so that they respectively reflect a beam coming from the focus line 48 and divergent in a beam plane extending parallel to the X-direction, and essentially focus it back in a further beam plane parallel to the X-direction, so that, overall, the two cylindrical mirrors 40 and 42 form a resonator-like optical element, which reflects the laser beam back and forth and focusses it respectively on the focus line 49 in the beam plane parallel to the X-direction, and which constitutes the optical beam guidance system 32 for heating the flow of coating powder 12 in the melting zone 18.

To couple the divergent laser beam coming from the laser 30 in an appropriate manner into the optical beam guidance system 32 on a coupling-in side 31 averted from the substrate 22, an optical coupling system, given the overall reference 52, is provided which focusses the laser beam 28 differently in different beam planes.

The laser beam 28 initially passes through a first cylindrical lens 54, which forms a laser beam 28a propagating essentially parallel or in collimated form in the YZ-plane, from the divergent propagating laser beam 28. This laser beam 28a propagating essentially parallel in the YZ-plane (FIG. 3) now passes obliquely through the focus line 48 and strikes against the mirror surface 44 of the mirror 40, is then reflected as laser beam 28b in the direction of the focus line 48, strikes against the mirror surface 46 of the cylindrical mirror 42, and is then reflected back again by this to the focus line 48, and so on. As the focus line 48 also lies in the YZ-plane, the parallel, incident laser beam in the YZ-plane is not essentially changed in shape even by the cylindrical mirrors 40 and 42, if one ignores a slight widening, but is only reflected back and forth in the YZ-plane.

However, the conditions in the XZ-plane are different. The first cylindrical lens 54 does not have an effect on the shape of the beam in the XZ-plane. In order to shape the laser beam in the XZ-plane, a second cylindrical lens 56 and a third cylindrical lens 58 are provided, which firstly form an essentially parallel or collimated laser beam from the divergent laser beam 28, and then focus the laser beam in the XZ-plane onto the focus line 48, which runs approximately perpendicular to the XZ-plane, that is with a divergence adapted to the curvature of the mirror surfaces 44 and 46, so that the laser beam, coming from the focus line and striking against the cylindrical mirror 40 for the first time, to be coupled into the optical beam guidance system 32, has exactly the divergence, which, with the given curvature of the mirror surface 44, will cause this surface to focus the laser beam 28b against after reflection onto the focus line 48, in which case the reflected laser beam 28b no longer lies exactly in the XZ-plane but, as may be seen from FIG. 3, runs in an XZ'-plane, which is slightly inclined relative to the XZ-plane, and direction Z' forms a small acute angle with direction Z.

The cylindrical lenses 54, 56, and possibly also the cylindrical lens 58, may be combined to form a special optical system, a lens in the simplest case.

Because, as shown in FIG. 3, the Y-direction also forms a small angle with the focus line 48, the coupled-in laser beam 28b is reflected back and forth in the optical beam guidance system 32, whereby the beam cross-section in the YZ-plane only changes inconsequentially, however focussing occurs respectively in the region of the focus line in all XZ'-planes standing perpendicular to the YZ-plane, and therefore a flow of coating powder 12 passing through the melting zone, with its direction of passage 34 preferably coaxial to the focus line 48, is heated in each of the heating zones 36 by a laser beam 28b, which has an unchanged cross-section in the direction of passage 34, but is focussed transversely to the direction of passage 34.

Hence, overall, the optical beam guidance system 32 according to the invention causes the flow of coating powder 12 in the melting zone 18 to pass through a plurality of consecutive heating zones 36 in the direction of the focus line 48, so that the laser beam 28b crosses the flow of coating powder 12 several times, and therefore the laser beam 28b can be used several times to heat the flow of coating powder 12, and thus for melting the coating powder transported through the melting zone 18.

If the two cylindrical mirrors 40 and 42 are arranged so as to be exactly concentric to the focus line 48, then the laser beam 28b moves through the optical beam guidance system 32 and exits from the optical beam guidance system 32 again on a side opposite the coupling-in side.

Figure 6:
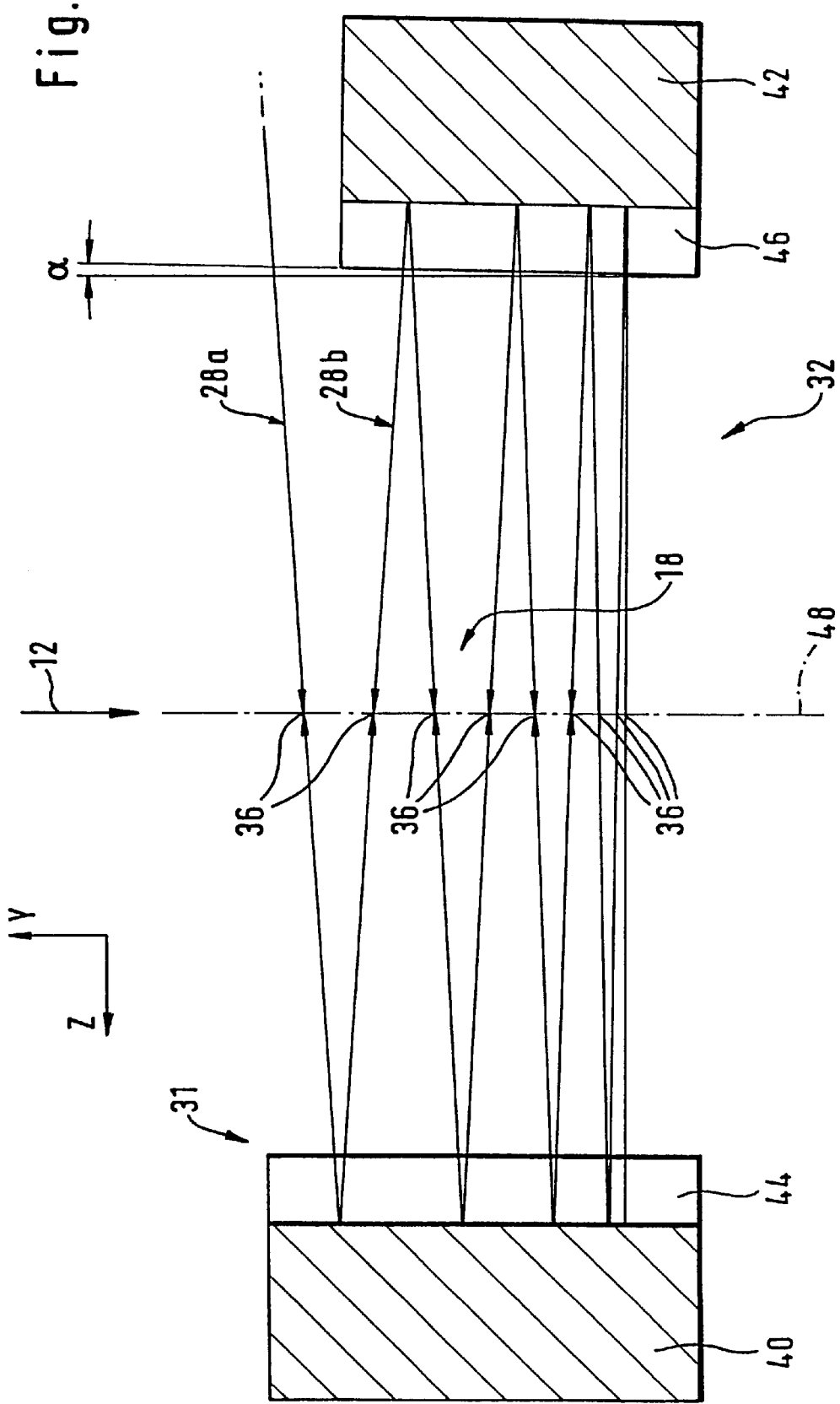
FIG. 6 shows a section taken along line 6—6 in FIG. 5.

For duplication of the interaction between the laser beam 28b and the flow of coating powder 12 in the melting zone 18, a preferred provision is that the two cylindrical mirrors 40 and 42 are not exactly concentric to the focus line 48, but—as shown in FIG. 6—are tilted relative to one another at a small angle α located in the YZ-plane. This causes the angle between the propagation direction of the laser beam 28b and the focus line 48 to increase, as the reflection of the laser beam in the optical beam guidance system 32 increases, and finally reach 90°, so that in the direction of passage 34, the laser beam 28b does not move further in the direction of the substrate 22, but, as a result of its reflection back and forth, moves back again between the cylindrical mirrors 40 and 42 in the direction of the incoming laser beam 28a, and once again leaves the optical beam guidance system 32 on its coupling-in side.

This causes the number of melting zones 36 to double as a result of the laser beam 28b moving back again through the optical beam guidance system 32, and thus enables the interaction between the laser beam 28b and the flow of coating powder 12 in the melting zone 18 to increase further.

Figure 7:
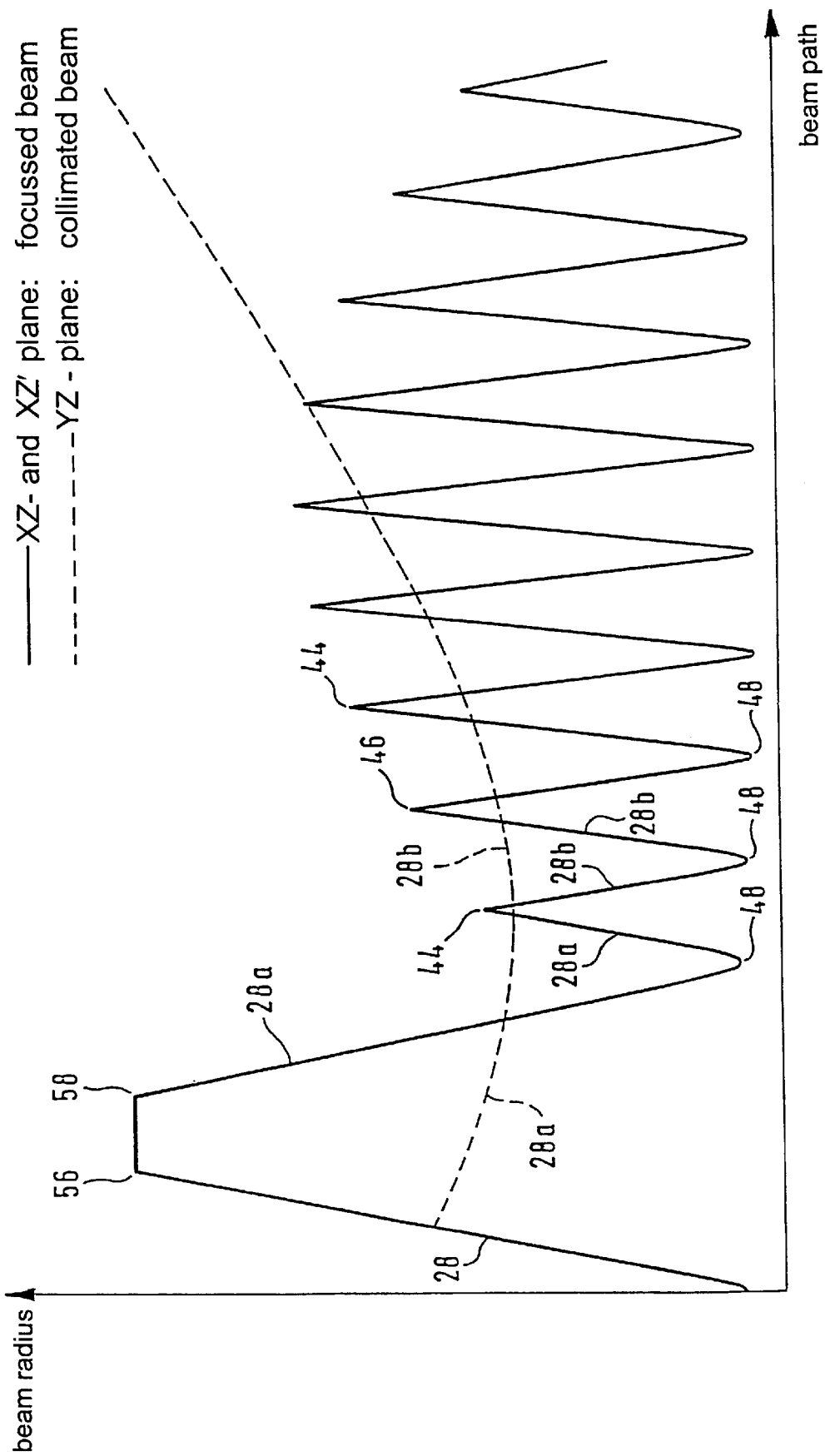
FIG. 7 is a diagram representing the beam cross-section with a combination comprising the optical coupling system and optical beam guidance system according to FIG. 2.

The interaction of the optical coupling system 52 with the optical beam guidance system 32 for shaping the laser beam is shown once again in summary in FIG. 7. The solid line therein shows the beam cross-section in the XZ- and subsequent XZ'-planes, while the broken line shows the course of the beam cross-section in the YZ-plane.

As shown in FIG. 7, the laser beam 28 coming from the laser 30 is shaped by the second cylindrical lens 56 into an essentially parallel beam, is focussed again by means of the third cylindrical lens 58 and, as laser beam 28a, passes through the focus line 48, in which it has the smallest beam cross-section in the XZ-plane for the first time. After passing through the focus line 48, the laser beam 28a, as divergent beam, strikes against the mirror surface 44 for the first time, and, now as laser beam 28b running in the optical beam guidance system 32, is reflected by this mirror surface once again to the focus line 48 and focussed thereon. After passing through the focus line 48, the laser beam 28b then strikes against the mirror surface 46 of the cylindrical surface 42, from which it once again is reflected to the focus line 48 and focussed thereon, in order then to strike against the mirror surface 44 again.

In contrast, in the YZ-plane, the laser beam 28a only undergoes a slight variation in cross-section, which then also continues when the laser beam 28b is coupled into the optical beam guidance system 32, and leads to a widening of the cross-section as the optical path increases, said widening being caused by the natural divergence of a laser beam.

No further details have been given in association with the previous explanation of the individual embodiments for guiding the flow of coating powder 12 through the melting zone 18. In principle, it would be possible to allow the flow of coating powder 12 to pass through the melting zone in the form of a free jet of powder 20a, as shown in FIG. 5.

Figure 8:
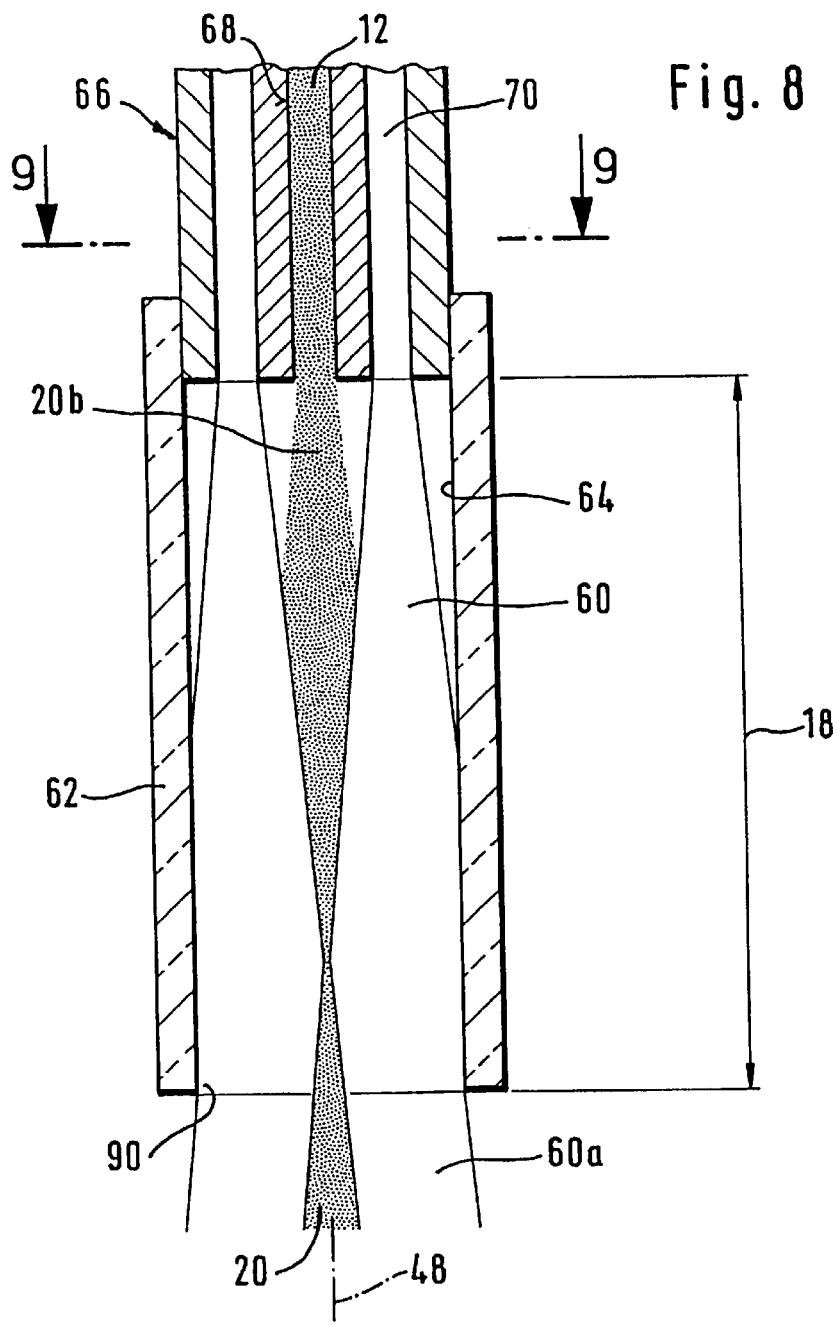
FIG. 8 shows a vertical section similar to FIG. 6 in the region of a jet of powder passing through a melting zone.

However, in order to enable defined guidance of the flow of coating powder 12, as shown in FIG. 8, a preferred provision is that, although the flow of coating powder 12 already propagates in the form of a jet of powder 20b through the melting zone 18, the flow of coating powder 20b is guided by a protective gas stream 60 enclosing it in the form of an envelope, which is in turn surrounded again on the outside by a jacket tube 62 transparent to the laser beam 28b.

The jacket tube 62 prevents the protective gas stream 60 from widening, and therefore it in turn guides the jet of powder 20b along the focus line 48 with as narrow a cross-section as possible. The protective gas stream 60 additionally prevents melted particles of the coating powder from adhering to the jacket tube 62, in particular to an inside wall 64 thereof, and thus impair its transparency to the laser beam 28b.

Figure 9:
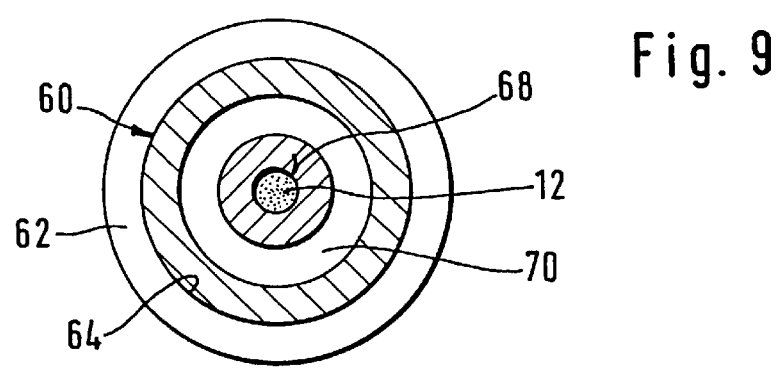
FIG. 9 shows a section taken along line 9—9 in FIG. 8.

In order to form such flow conditions in the jacket tube 62, a nozzle, given the overall reference 66, is provided upstream of the melting zone 18, as shown in FIGS. 8 and 9, which has an inner channel 68 for guiding the flow of coating powder 12 and an annular channel 70 surrounding this inner channel 68 in a ring shape with protective gas flowing through said annular channel with protective gas exiting from it to form the protective gas stream 60.

Figure 10:
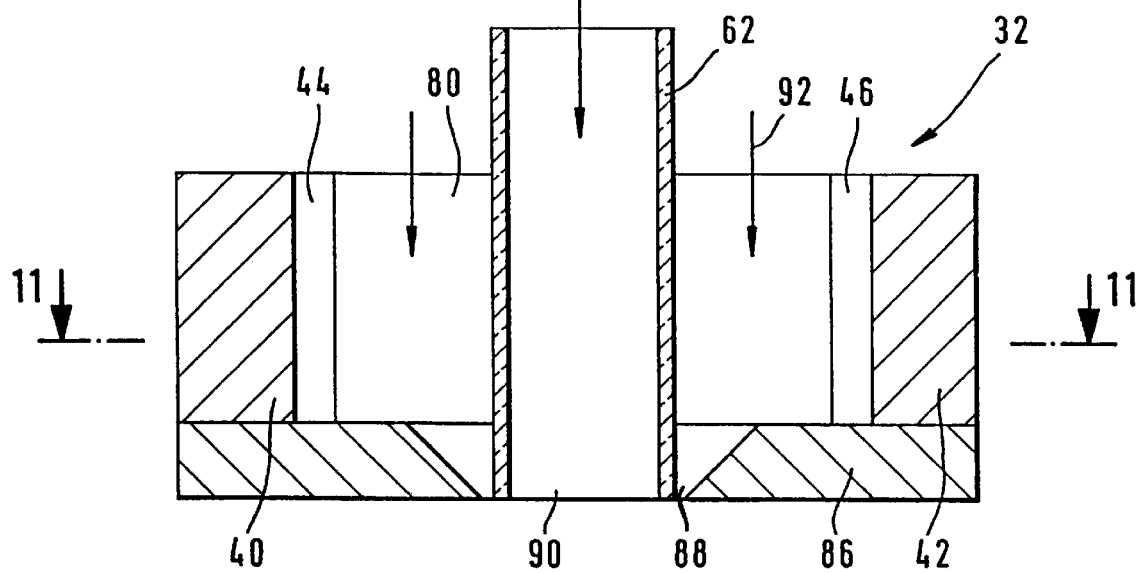
FIG. 10 shows a section similar to FIG. 6 through a variant of the optical beam guidance system according to the invention.
Figure 11:
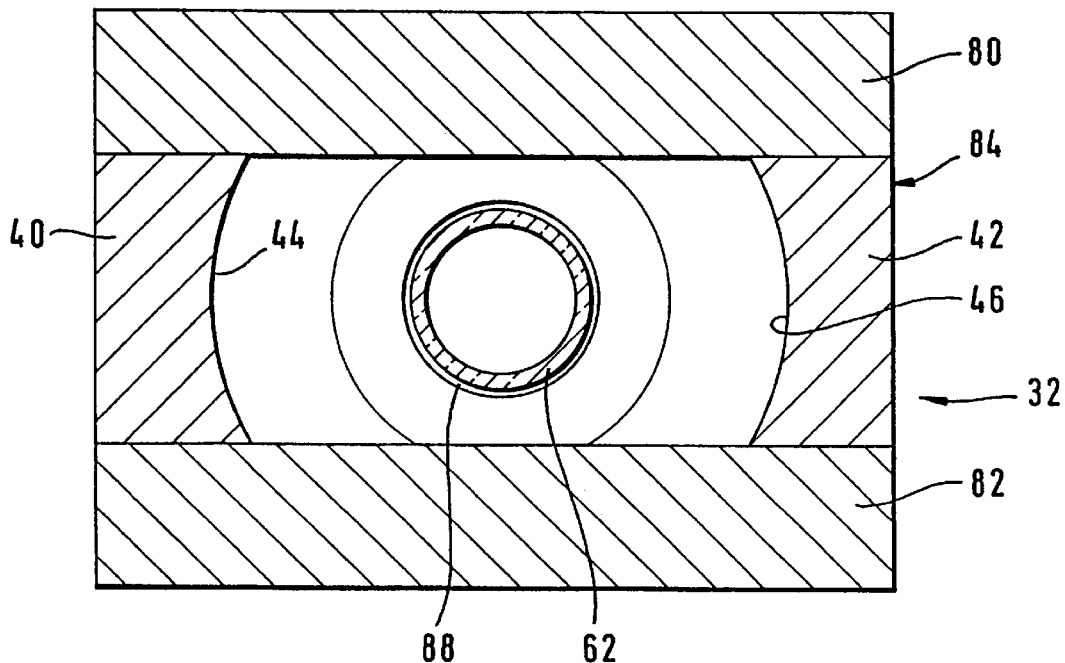
FIG. 11 shows a section taken along line 11—11 in FIG. 10.

A particularly preferred embodiment of a construction of the optical beam guidance system 32 according to the invention (FIGS. 10, 11) provides that the cylindrical mirrors 40 and 42 extend between two side walls 80 and 82 of a compact mirror assembly and are firmly connected to these side walls 80 and 82. The mirrors 40 and 42, as well as side walls 80 and 82, then in turn sit on a base plate 86, which has an opening 88, through which the tube 62 passes, and a lower opening 90 of the jacket tube 62 is located approximately at the level of the opening 88.

However, the opening 88 is larger than an outside diameter of the jacket tube 62, and this makes it possible to allow a further protective gas stream 92 to likewise pass between the tube 62 and the mirror surfaces 44 and 46. This further protective gas stream cools the mirror surfaces 44 and 46 as well as the jacket tube 62, and exits through the opening 88 in the base plate 86, surrounding the jacket tube 90, in order to form an additional screen for the protective gas stream 60a exiting from the opening 90 of the jacket tube 62, and thus provide even better protection for the jet of powder 20 surrounding the protective gas stream 60a with melted coating powder, and at the same time accelerate this as accelerating gas stream in the direction of the substrate, so as to enable surfaces running at least obliquely to the horizontal or perpendicular to the horizontal to be coated. With extreme acceleration, it is also possible to coat surfaces on their underside.

What is claimed is:

1. A powder coating apparatus for the application of melted coating powder onto a substrate, comprising:

a preparation unit for generating a flow of coating powder;

a powder applicator head, from which the flow of coating powder issues and spreads in the form of a directed jet of powder towards the substrate;

a melting zone, through which the flow of coating powder passes in a direction of flow, said melting zone being arranged in said powder applicator head, and comprising at least one heating zone;

an optical beam guidance system which directs a laser beam generated by a laser and propagating in a beam propagation direction onto the melting zone to melt the coating powder;

said optical beam guidance system comprising a plurality of reflecting elements for reflecting the laser beam by changing one beam propagation direction into another beam propagation direction; and said plurality of reflecting elements guiding the laser beam to cause the laser beam to pass several times through said at least one heating zone each time with its beam propagation direction extending transverse to said direction of flow to intersect said flow of coating powder.

2. The powder coating apparatus of claim 1, wherein:

said melting zone comprises several heating zones that are located adjacent to one another; and the optical beam guidance system guides the laser beam through said several heating zones.

3. The powder coating apparatus of claim 2, wherein:

the several heating zones form a series of consecutive heating zones extending in the direction of flow.

4. The powder coating apparatus of claim 1, wherein:

the heating zone covers an entire cross-section of the flow of coating powder.

5. The powder coating apparatus of claim 1, wherein:

said optical beam guidance system has focusing elements for focusing the laser beam.

6. The powder coating apparatus of claim 5, wherein:

the focusing elements focus the laser beam onto the respective heating zone in at least one beam plane.

7. The powder coating apparatus of claim 6, wherein:

the beam plane runs transverse to the direction of flow.

8. The powder coating apparatus of claim 1, wherein:

in a beam plane parallel to the direction of flow, the laser beam passes unfocussed through the heating zone.

9. The powder coating apparatus of claim 1, wherein:

the optical beam guidance system reflects the laser beam back and forth between said reflecting elements.

10. The powder coating apparatus of claim 9, wherein:

the optical beam guidance system reflects the laser beam back and forth between said reflecting elements in one plane.

11. The powder coating apparatus of claim 10, wherein:

the plane in which the laser beam is reflected back and forth runs parallel to the direction of flow.

12. The powder coating apparatus of claim 10, wherein:

the plane in which the laser beam is reflected back and forth runs perpendicular to the beam plane in which the optical beam guidance system focusses the laser beam towards the respective heating zone.

13. The powder coating apparatus of claim 1, wherein:

said optical beam guidance system has two reflecting surfaces arranged opposite one another, against which the laser beam strikes several times.

14. The powder coating apparatus of claim 13, wherein:

the reflecting surfaces have a curvature focusing the laser beam.

15. The powder coating apparatus of claim 1, wherein:

the coating powder is guided through the melting zone in the form of a jet of powder that is surrounded by a protective gas stream.

16. The powder coating apparatus of claim 15, wherein:

the protective gas envelope and the jet of powder pass through a jacket tube in the region of the melting zone.

17. The powder coating apparatus of claim 1, wherein:

after passing through the melting zone, the flow of coating powder is accelerated upon entering an accelerating gas stream.

18. A powder coating apparatus for the application of melted coating powder onto a substrate, comprising:

a preparation unit for generating a flow of coating powder;

a powder applicator head, from which the flow of coating powder issues and spreads in the form of a directed jet of powder towards the substrate;

a melting zone, through which the flow of coating powder passes in a direction of flow;

said melting zone being arranged in said powder applicator head, and comprising at least one heating zone;

an optical beam guidance system which directs a laser beam generated by a laser onto the melting zone to melt the coating powder;

said optical beam guidance system comprising a plurality of reflecting elements for reflecting the laser beam; and said plurality of reflecting elements guiding the laser beam to cause the laser beam to pass several times through said at least one heating zone in a direction that is transverse to said direction of flow, wherein:

after passing through said optical beam guidance system, the laser beam exits from said optical beam guidance system on a side averted from the substrate.

19. The powder coating apparatus of claim 18, wherein:

said laser is coupled into said optical beam guidance system on a coupling-in side thereof; and after passing through said optical beam guidance system, the laser beam exits from said optical beam guidance system on said coupling-in side.

20. The powder coating apparatus of claim 19, wherein:

said coupling-in side lies on a side of the optical beam guidance system averted from the substrate.

21. The powder coating apparatus of claim 20, wherein:

said two reflecting surfaces are tilted relative to one another at a small angle which opens towards said coupling-in side.

22. The powder coating apparatus of claim 16, wherein:

the jacket tube guiding the jet of powder and the protective gas envelope is surrounded on the outside by a further protective gas stream.

23. A powder coating apparatus for the application of melted coating powder onto a substrate, comprising:

a preparation unit for generating a flow of coating powder;

a powder applicator head, from which the flow of coating powder issues and spreads in the form of a directed jet of powder towards the substrate;

a melting zone, through which the flow of coating powder passes in a direction of flow, said melting zone being arranged in said powder applicator head, and comprising at least one heating zone; and an optical beam guidance system which directs a laser beam generated by a laser and propagating in a beam propagation direction onto the melting zone to melt the coating powder; wherein:

said optical beam guidance system comprises a plurality of reflecting elements for reflecting the laser beam by changing one beam propagation direction into another beam propagation direction;

said plurality of reflecting elements guides the laser beam to cause the laser beam to pass several times through said at least one heating zone each time with its beam propagation direction extending transverse to said direction of flow to intersect said flow of coating powder;

the optical beam guidance system reflects the laser beam back and forth between said reflecting elements in one plane; and the optical beam guidance system guides the laser beam as an essentially parallel/collimated beam in the beam plane running parallel to the plane in which the laser beam is reflected back and forth.

* * * * *